2,494,939

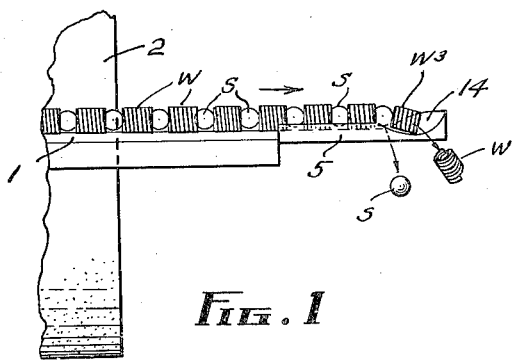
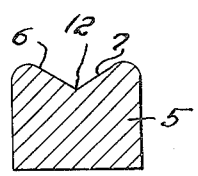
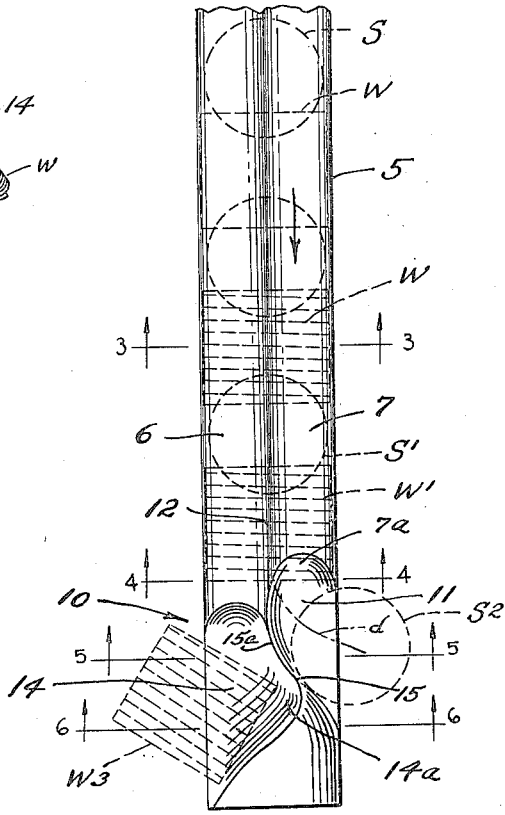
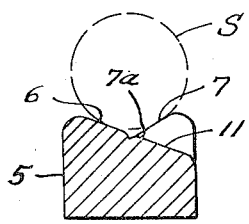
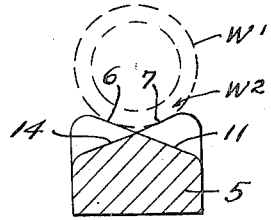
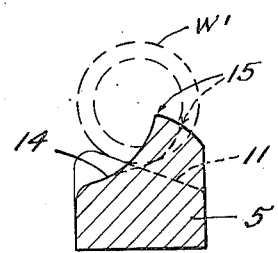
INVENTORS
KEITH L. NANCE
LEROY R. CHANCE Patented Jan. 17, 1950

UNITED STATES PATENT OFFICE 2,494,939

SEPARATION OF CYLINDERS FROM SPHERES

Keith Lloyd Nance and Le Roy Richard Chance, Indianapolis, Ind., assignors to L. G. S. Spring Clutch Corporation, Indianapolis, Ind., a corporation of Indiana Application January 13, 1948, Serial No. 1,978

3 Claims. (Cl. 209—90)

The application of W. W. Gleeson, Serial No. 752,142 filed June 3, 1947, entitled "Centerless grinding process" shows and claims a method of through-feeding of generally cylindrical and tubular work pieces such as clutch spring blanks to centerless grinding tools, said method comprising, essentially, spacing the pieces apart by interposed spherical separator members for advancement of the pieces serially along a guide to and past the zone of operation of the tools. By that method the adjacent ends of the pieces cannot come into contact with each other so as to interfere with proper grinding, as fully explained in said application.

The present invention is concerned with a simple and effective method of and apparatus for continuously segregating differently formed parts such as the work pieces and separator members mentioned, while being discharged as from a trough-like guide, so as to avoid having to segregate the parts by hand. Thereby the separator members can, if desired, be continuously resupplied to the feeding side of the grinding machine, and the ground work pieces very conveniently inspected and/or cleaned or subjected to further processing etc. The above indicates the principal objects hereof.

A specific object is to provide a simple and effective and practicable work segregating means for separating spherical objects from generally cylindrical objects while being fed, for example, in alternating arrangement to separating or segregating position along a generally horizontal guide.

Other features of the invention will be explained in connection with the accompanying drawing, wherein Fig. 1 is a side view of the work guide as arranged in association with centerless grinder wheels, part of one of the latter being shown; Fig. 2 is a plan view of the guide and segregating means hereof in one form, the work pieces and separator members being indicated thereon diagrammatically by broken lines, and Figs. 3 to 6 inclusive are transverse sections taken as conventionally indicated on Fig. 2.

In Fig. 1 a discharge portion of a work guide or rail 1 is more or less diagrammatically or incompletely shown in its usual position adjacent or along side of the grinder wheel 2. The feed wheel is not shown. The guide may be simply a trough at its discharge portion, aligned with a receiving trough shaped guide 5 for the work pieces W, shown as simple helical clutch springs, and the separator members S shown as metal balls. The trough-feeding process as disclosed by said application results in pushing the series of work pieces and separators in mutual light contact with each other from the rail 1 onto the top relatively intersecting faces 6 and 7 of the guide 2 which, operatively, form a shallow V guide which maintains the work pieces and separators approximately in alignment up to the segregating point or region 10. Because of the weight of the pieces W and friction contact thereof with the V-forming guide faces 6 and 7 the spherical separators S remain usually in full peripheral contact with the work pieces partially entering their tubular ends as apparent from Figs. 1 and 2. The separators have a somewhat smaller diameter than the external diameters of work pieces but are nevertheless much larger than the internal diameters or axial holes in the work pieces. Thus the two nest together or lightly interlock as advanced along the guide. Because the separators are in such nested relationship with the holes of the pieces W and may be slightly mutually adherent, a separating force is sometimes necessary to be exerted at the segregating region in a direction generally axially of the work pieces.

As will be evident from Figs. 2 and 4 to 6, one side of the guide face 7 merges at 7a into a relatively narrow ramp face 11 extending and sloping laterally from the axial center 12 of the guide, contiguous therewith and obliquely thereof in the general direction of advance of the pieces as indicated by the arrow on Figs. 1 and 2. The balls S thereby roll off to the right Fig. 2 as at S2 on the ramp 11 as along the indicating line $d$ and are discharged, usually, into the funnel-shaped mouth of a gravity conveyer tube (not shown) leading (e. g.) back to the feeding side of the grinder machine.

The leading one W1 of the centerless ground clutch springs W in the trough, Fig. 2, is projected across the relatively narrow ramp surface 11 by the oncoming pieces S and W to where it comes in contact with a camming surface portion 14a of a relatively wide ramp surface 14. The ramp 14 slopes oppositely from the ramp 11 and is in offset relation thereto longitudinally of the guide 5. The clutch springs, of course, have to be longer than the initial defining surface of the ramp 11 (portion contiguous to the center 12 of the guide) in order to reach across as mentioned. Usually the springs are of ample length, being wound with enough coils so that they are longer than their diameter. They need not be that long for effective segregation from the separator balls by the present apparatus.

The right hand portion of the ramp surface 14 as viewed in Fig. 2 is defined in part by a rib or rim portion 15 of the guide 5 which portion beginning at about the point 15a, Fig. 2, slopes and curves gradually upwardly and extends to the right of the longitudinal center 12 of the guide whereby to present the leftward sloping cam surface portion 14a in proper position out of line with the guide center for contact with the leading peripheral edge portion of the oncoming clutch spring approximately at the point or region indicated W2 in Fig. 5. At about the time such leading edge portion of a leading clutch spring W1 encounters the cam surface portion 14a of the leftward sloping ramp the leading ball S1 (Fig. 2) rolls out from its position between the two adjacent and still aligned leading clutch springs, thus accelerating the movement of the foremost clutch spring which is in engagement with the cam, and the latter clutch spring is thus forcibly ejected to the left somewhat as indicated at W3.

The ejected clutch springs roll or tumble off the ramp 14 into a suitable receptacle, hopper or the like, not shown. Since the clutch spring ends are apt to be wet and sticky from accumulations of grinder compound and metal grinding residue, the sudden force exerted by the ball on the clutch spring which is about to be ejected to the left as described is important especially when the springs are unusually short and barely bridge across to the beginning of the camming surface 14a.

We claim:

1. A segregating device including a guide adapted to support serially arranged generally cylindrical and spherical articles for movement therealong in a single direction in mutual contact with each other, said guide terminating in oppositely sloping mutually contiguous ramps extending laterally of said direction in obliquely offset relationship to each other along the central axis of the guide so as to provide a first encountered ramp, the effective entrance to the first ramp being less wide than the length of the cylindrical articles so that the latter are prevented from rolling off the first ramp and a second encountered ramp having an effective entrance at least as wide as the length of the cylindrical articles and having a camming surface portion, the upper defining limit of which divides the ramps, said portion rising from the guide and extending beyond the guide center on the side occupied by the first encountered ramp and then back across the center to the other side.

2. A guiding and segregating upwardly open trough adapted to support serially arranged generally cylindrical and spherical articles for movement along the trough in one direction in mutual contact, said trough terminating in laterally extending, oppositely sloping first and second encountered mutually contiguous ramps in obliquely offset relationship to each other along the axis of the trough and contiguous therewith, the effective entrance to the first ramp being less wide than the length of the cylindrical articles so that the latter are prevented from rolling off the first ramp, the second encountered ramp having an effective entrance at least as wide as the length of the cylindrical articles and including a sloping surface curving upwardly from the bottom of the trough and extending on both sides of the vertical longitudinal plane of said bottom whereby to support and deflect the cylindrical articles toward the second encountered ramp when the cylindrical articles are projected beyond the first encountered ramp.

3. Apparatus for segregating generally spherical and generally cylindrical articles when advanced in approximate alignment along a common path, said apparatus comprising an upwardly open V-shaped trough terminating in a ramp extending laterally from and contiguous with the bottom of the V in one direction, said ramp having an effective entrance of such limited transverse dimension in respect to the length of the cylindrical articles that the latter cannot roll therethrough, a second ramp sloping laterally from the bottom of the V in the opposite direction and beginning at a point beyond the beginning of the first ramp in the direction of movement of the articles, the second ramp including a cam surface defined at one side by a rim curving upwardly from the bottom of the trough and extending beyond the trough center in a direction away from the second ramp and then rising and curving obliquely in the opposite direction for engagement by leading end portions of the cylindrical articles projected beyond the first ramp.

KEITH LLOYD NANCE.
LE ROY RICHARD CHANCE.

REFERENCES CITED

The following references are of record in the file of this patent:

UNITED STATES PATENTS

| Number | Name | Date |
|---|---|---|
| 229,712 | Junkin | July 6, 1880 |
| 1,456,216 | Brightman | May 22, 1933 |
| 2,329,873 | Buzly | Sept. 21, 1943 |
| 2,332,506 | Curtis | Oct. 26, 1943 |
| 2,342,652 | Eakins | Feb. 29, 1944 |